July 4, 1961 G. R. RUMONSKI 2,990,808
MEANS FOR STORING AND PRESERVING LIVE TUBIFEX WORMS
Filed March 24, 1959 2 Sheets-Sheet 1
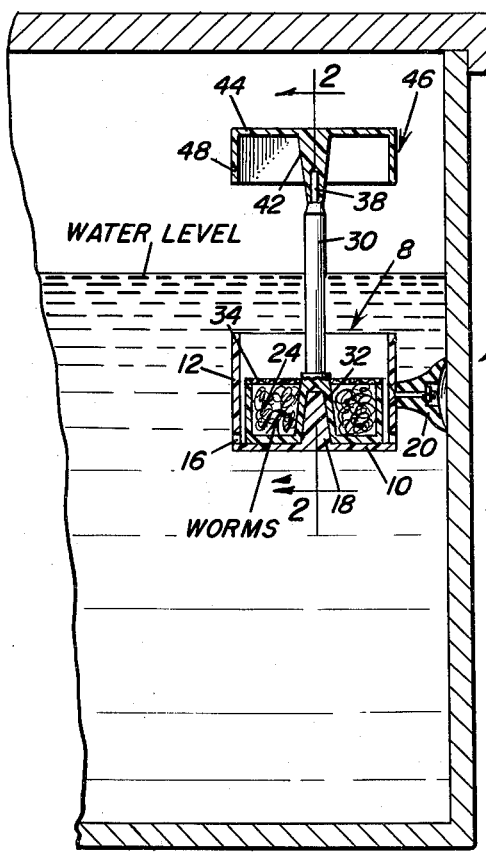
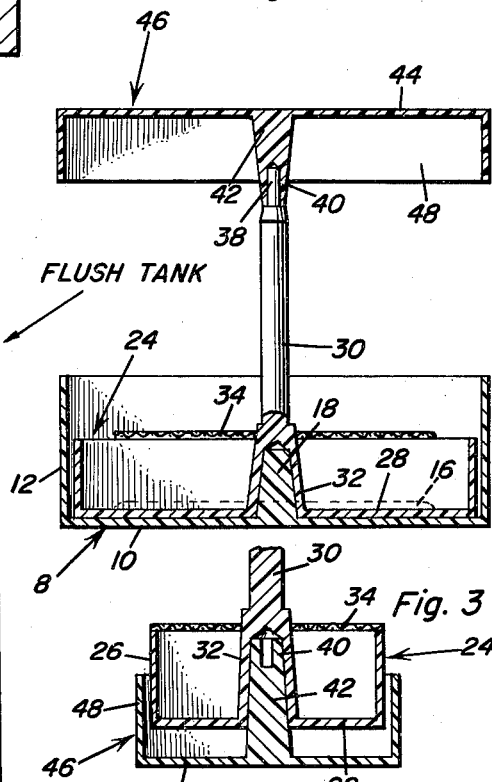
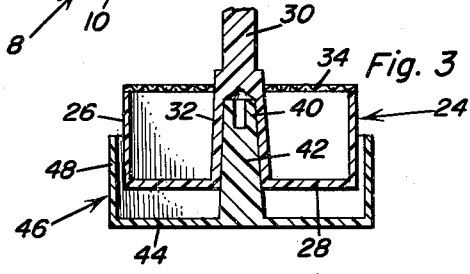
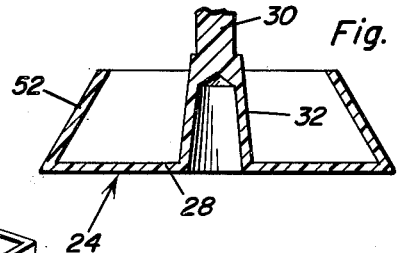
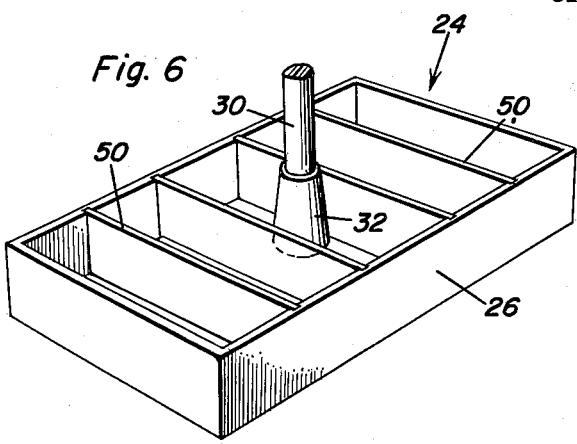
George R. Rumonski
INVENTOR.

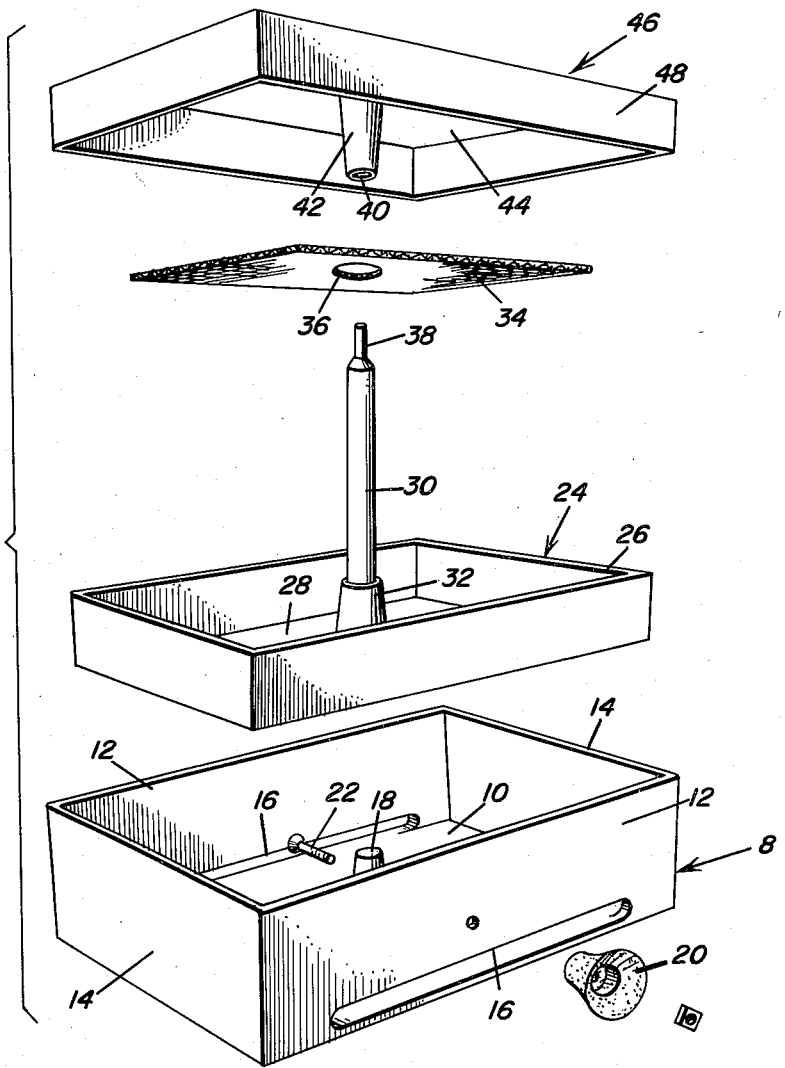
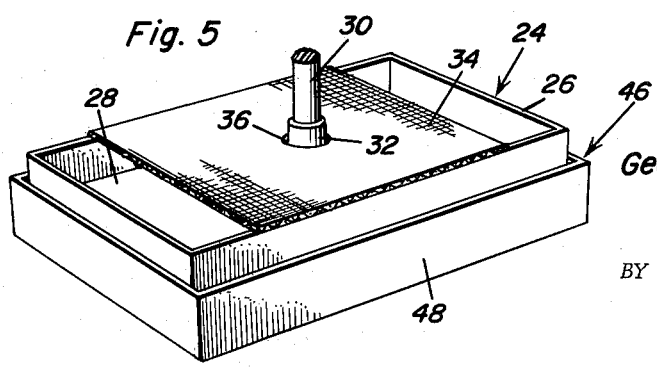

2,990,808
MEANS FOR STORING AND PRESERVING LIVE TUBIFEX WORMS
George R. Rumonski, 30 W. Curtis St., Linden, N.J.
Filed Mar. 24, 1959, Ser. No. 801,530
6 Claims. (Cl. 119—1)

The present invention relates to certain new and useful improvements in simple, practical and reliable means through the medium of which tropical fish food, live Tubifex worms for example may be effectively stored and preserved and expeditiously and easily utilized for practical fish feeding needs in the home or elsewhere.

As the above statement implies Tubifex worms are not only in widespread use, they are highly recommended by authorities on tropical fish because the nutritional and food value to fish has been repeatedly proved. However, it is a matter of common knowledge that these food worms must be alive when fed to fish. This factor has posed many problems in need. Generally, in order to keep Tubifex worms alive, they must be kept in cool running water. Currently, but two known solutions to the problems are followed.

The first solution involves placing the worms in a glass container or the like and covering the worms with water, then placing the filled container in a refrigerator. Since the worms consume the oxygen existing in the water, this procedure is satisfactory only if the water is changed not less than twice daily. This practice is perplexing and indeed a nuisance. However, if this precaution is not taken, the worms are apt to die and decay after one day of neglect. The possibility of spilling water in the refrigerator while handling the container is obviously objectionable for which reasons the stated procedure is not unqualifiedly endorsed.

There may be times when a person is unable, because of absence from the home, to change the water in the container at the prerequisite time. On these occasions, as stated previously, the worms begin to decay often forcing the owner to throw out the entire supply. Not only this, inadvertently placing dead worms in a fish tank or aquarium contaminates the water and makes the fish susceptible to disease and not infrequently to death. Then too, the odor given off by the worms is frequently detected in the refrigerator and therefore detracts from this mode of storage and handling. Moreover many aquarists abhor the idea of storing live worms in a refrigerator. Consequently, this alleged solution of the problem is not popular with most fish fanciers.

A second solution, if it may be called such, is to place the worms in a rather large unwielding or cumbersome container. The container is provided with an open faucet which serves to trickle water into the container. However, this requires, at opposite end of the container drainage facilities which serve to discharge the water at the same rate that it is supplied to the container. The result is a steady flow of water over the worms, thus assuring the worms a steady supply of cool oxygen laden water. However, this method has disadvantages. To utilize this method the services of a plumber are generally necessary to supply the piping and facilities needed and the plumbing job can be a costly one.

Another disadvantage is that, other than the basement, there is no convenient place in the average home to install such an apparatus. Apartment dwellers who are fish fanciers cannot use the method at all. If the apparatus is installed in a basement there can be no assurance that children and animals would not play in the water and disturb the worms. If one finds this method more desirable than placing worms in a refrigerator and elects to install the costly apparatus in the home he still faces a rather expensive water bill. To sum up, this alleged solution of the problem though somewhat better than the first mentioned still leaves much to be desired.

It follows that the obvious object of the instant concept is to provide ways and simple mechanical means whereby the over-all problems are not only taken into account but are effectually, it is believed, solved. With the use of the instant invention the worms have a constant supply of cool fresh water and there are no costly installation situations involved. In fact, all of the various objections noted above have been overcome and what is important there is no detectable odor to cope with, the costs are negligible and the worms while stored and kept in an excellent condition are completely out of sight and out of reach of most youngsters.

Briefly, the concept has to do with a stationary tank which is adapted to contain cooled water and wherein the used water may be flushed out and replenished from time to time with fresh cool water. A receptacle for the worms is provided and the worms are confined therein and kept for periodical fish feeding needs. Supporting and retaining means for the receptacle is mounted in the tank below the normal water level and the worm containing and confining receptacle is removably supported in and by way of said means. More specifically, the "tank" comprises a conventional toilet flush tank where the water supply is changed each time the tank is flushed.

The preferred embodiment of the receptacle for the worms is a simple and expedient relatively shallow pan-like member or keeper. This member is provided centrally with an upstanding handle which has a number of functions which will be elaborated upon as the description proceeds.

Broadly, a suitable adapter device is provided and installed in the tank and attached to the wall of a tank so that it assumes a position below the water level. This device takes the form of a box-like receiver. It has side walls provided with elongated slots for water circulation purposes and the slots may be close to the level of the bottom. The receptacle portion of the box or container serves to telescopically receive the insertable and removable worm holding or confining receptacle or keeper. The latter is provided with a handle which extends above the open top of the receiver or container and in fact above the tank's normal water level where, if desired, the upper end serves as a place for mooring a normally inverted removable drip-tray. The drip tray is exteriorly detachably connectible with the receptacle to trap overflow water and to facilitate neat and practical handling of the receptacle after it has been lifted out of the tank water and is to be hand carried, much in the fashion of a basket, from the flush tank to the fish tanks or aquariums wherever they may be located.

Numerous other features and advantages will become evident from the specification when read in conjunction with the drawings and considered in the light of the subjoined claims.

In the drawings, wherein like numerals are employed to designate like parts throughout the views:

FIG. 1 is a fragmentary sectional view of a toilet type flush tank illustrating the over-all invention, the manner in which it is constructed and used.

FIG. 2 is an enlarged view taken on the plane of the vertical line 2—2 of FIG. 1, looking in the direction of the arrows.

FIG. 3 is a fragmentary sectional view the purpose of which is to show how the drip tray, after it has been detached from its supported position in FIG. 1, is removably attached to the bottom of the basket-like receptacle or keeper when handling and transporting the same.

FIG. 4 is an exploded perspective view wherein all of the essential components or parts are clearly shown in proper relative relationship.

FIG. 5 is a perspective view of the receptacle with the drip tray attached, a portion of the handle being broken away.

FIG. 6 is a perspective view of a modified form of receptacle or keeper.

FIG. 7 is a view in section of a further modification of the receptacle wherein the walls are inclined to more satisfactorily confine the worms (not shown) in the receptacle.

Reference will be made first to FIG. 4 wherein it will be seen that the adapter device or means comprises a generally rectangular box-like container or receiver 8. This part as well as the other parts, may be made of suitable commercial plastics or non-corrodible sheet material such as the manufacturer will prescribe. The receiver is of box-like form and open at the top and has an imperforate bottom 10 and upstanding side walls 12 and transverse end walls 14. The side walls, above the level of the bottom, are provided with elongated water circulating slots or openings 16. There is a truncated conical coupling member or projection 18 attached to and rising from the center of the bottom. In actual practice this receiver (broadly adapter means) may be mounted to function as a support in any one of a number of ways. Experimentally it has been found that a rubber suction cup 20 will do. This cup is bolted or otherwise secured by a bolt 22 to one side wall in the manner shown in FIG. 1.

The companion part or component just above the receiver may be variously designated. Broadly, it is a holder, keeper or a receptacle for confining the live Tubifex worms in the manner illustrated in FIG. 1. It comprises a sheet material relatively shallow rectangular pan 24 having upstanding walls 26 rising from the bottom 28. The bottom and walls are imperforate. The depth of the receptacle is approximately one-half the depth of the receiver. This is so because the walls have to extend above the water circulating slots 16 but must preferably be on a level below the upper edges of the walls 12 and 14 of the receiver 8. An appropriate handle is provided. The handle is here designated at 30 and comprises a stem whose lower end portion is fashioned into a truncated conical female coupling member 32 which frictionally accommodates the male coupling member 18 so that the two parts 8 and 24 may be releasably coupled together in telescoping relationship. If desired, a partial screen 34 may be provided and this has an opening 36 at the center which slips down over the handle and encircles the coupling member 32 in the manner illustrated. The upper reduced end 38 of the handle is provided to fit removably as a second male coupling member into a socket 40 provided therefor in the female coupling member 42 carried by the central portion of the bottom 44 of the normal upside-down drip tray 46. The drip tray is rectangular in form and of a size that its marginal walls 48 serve to encompass the cooperating walls 26 of the receptacle 24 in the manner illustrated for example in FIGS. 3 and 5.

It is within the purview of the invention to dispense with the screen 34 if desired. It is also within the purview of the invention to employ dividers or partitions 50 (FIG. 6) within the receptacle to define pockets or individual cells for the worms. Then too, it may be desirable under certain circumstances to employ inclined marginal walls 52 on the receptacle in the manner shown in FIG. 7. FIG. 7 is hardly a modification but a simple extension of the basic idea seen in the other figures and therefore the same reference numbers are being employed.

I shall now describe how the invention is used. Commonly known is the fact that as a toilet is flushed, the water in the water-closet flushes down into the toilet bowl, draining the water-closet. Then fresh water enters the water closet until it is filled once again. My worm storing and preserving means takes advantage of this draining of the water and of the refilling with fresh water. Specifically, it is accomplished in this manner.

Assume the water closet to be filled with water. The invention is then attached either to a side of the water closet or to any pipe, rod, etc., that is found in a water closet. The purpose is to keep the worm storing and preserving keeper stationary and completely submerged in the water except for the tray. The sides of the worm keeper 24 could extend beyond the water level, but this is not too desirable because it would restrict the circulation of the water in the container. Also, any dirt that may settle upon the worms would be floated out of the keeper or receptacle if the container is completely submerged. The worms are in this basket-like keeper. At this point, the worms have all the requirements to keep alive. In the average household, the toilet is used rather frequently. Everytime that the toilet is used, it gives the worms a fresh supply of water, the water being just as cool as running water. This is accomplished in the following manner.

Now assume the toilet has been flushed. The water drains from the water closet and also from the container or receiver 8 through the slots or openings 16. The water does not drain from the keeper 24. This effect is not wanted because the worms should be under water at all times. Therefore, the precaution of retaining the water in the keeper is to assure the worms a supply of water while the water in the water closet is emptied and refilled. Once the water closet is filled again, the fresh water would be, of course, cool thus solving the problem of keeping these worms in cool, fresh water.

When worms are needed for the fish, the dry drip tray 46 is removed, turned right side up and held in the hand. The keeper handle 30 is grasped between the fingers and the keeper is removed from the container or receiver 8 and placed upon the drip tray or vice versa. Since the keeper 24 will then be filled with water and worms, the drip tray will catch any spillage. With the drip tray and keeper in the stated relationship (FIG. 3), they are carried to the fish tank (not shown) where the worms are removed with tweezers and placed into a worm feeder in said tank. The worms not needed are returned to the receiver 8, inserted inside of it, and the drip tray placed once again upon handle (FIG. 1). In this manner, a person never needs to touch a worm or even get one finger wet in the whole process of keeping worms or of feeding them to the fish.

As stated previously, the container or receiver 8 must be attached inside of the water closet so as to be stationary. This can be accomplished by using suction cups, wire, or any other method suitable for this purpose. The container can be attached to the wall of the water closet or to a pipe, rod, etc. found in a water closet.

The sides of the container 8 could extend above the water level, but this is not too desirable because it would restrict the circulation of the water in the container. Also, any dirt that may settle upon the worms would be floated out of the container if the container is completely submerged.

The walls 12 of the entire container could be perforated, but this would not be desirable. Occasionally, a few stray worms will float about, a few inches from the floor of the container. If the walls were entirely perforated, these few stray worms could conceivably float out through the openings, and wander about the tank water. Therefore, by keeping the walls enclosed, except for the openings 16, the few stray worms will be relatively confined to the container.

The shape of the basket-like keeper 24 must be identical to that of the container into which the keeper fits. However, there must be sufficient space between the walls of the keeper and container 8 so as to allow the water to properly drain from the container.

The mesh screen 34 or any suitable material may be used to fit over the keeper so as to partially cover the top of the keeper. The purpose of this is to prevent any worms from wandering out of the keeper. The stem or handle of the keeper extends through a hole provided in the screen.

The sole function of the drip tray is to receive the keeper so that when the latter is removed from the container and placed upon the tray, any drippings will be caught and trapped by the tray. In this way, no drippings will soil the floor while the assembly is being carried to and from the fish tank.

There is a way which the worm keeper could function without the use of a basket at all. The only modification of the given container needed would be to have the oblong openings placed approximately ⅓ up from the bottom of the container instead of at the extreme bottom (not detailed). The worms are placed into the container so that they settle to the bottom. As the water drains from the container through the openings, it would not drain below the level of the openings, thus retaining water in the container until the water-closet fills once again.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For utilization in a toilet flush tank; means for storing and preserving live worms comprising an open top box-like receiver having a bottom and upstanding marginal walls, certain of said walls having water circulating openings, means carried by said receiver whereby it may be supported from an interior part of the tank and immersed in the water in the tank with the top facing upwardly, a receptacle for the worms, said receptacle being seated removably in the receiver and having an upstanding handle, the openings in said receiver being elongated slots located just above the level of the bottom of the receiver, said receptacle comprising a relatively shallow imperforate pan the top of the walls thereof being in a plane above the slots but below the top edges of the walls of the receiver, said handle extending well above the open top of the receiver.

2. The structure defined in claim 1, and, in combination, a drip-tray removably mounted atop said handle, said drip tray having means whereby it may be detachably mounted on and beneath the pan whenever necessary or desired.

3. The structure defined in claim 1, and in combination, a drip tray removably mounted atop said handle, said drip tray having means whereby it may be detachably mounted on and beneath the pan whenever necessary or desired, said means comprising a stud on the bottom of the tray which is adapted to fit telescopically and removably into a socket provided therefor on the bottom of said pan, said pan having a removable optionally usable screen to substantially cover the top of said pan.

4. For utilization in a toilet flush tank; means for storing and preserving live worms comprising an open top box-like receiver having a bottom and upstanding marginal walls, certain of said walls having water circulating openings, means carried by said receiver whereby it may be supported from an interior part of the tank and immersed in the water in the tank with the top facing upwardly, a receptacle for the worms, said receptacle being seated removably in the receiver and having an upstanding handle, the openings in said receiver being elongated slots located just above the level of the bottom of the receiver, said receptacle comprising a relatively shallow imperforate pan, the top edges of the walls thereof being in a plane above the slots but below said top edges, a portion of said handle extending well above the open top of the receiver, a complemental drip tray normally assuming an inverted position in parallelism above said receiver, said tray having a depending stud which is connected with the bottom of the tray, and means on the upper end of said handle with which said stud is detachably connected.

5. For utilization in a toilet flush tank; means for storing and preserving live worms comprising an open top box-like receiver having a bottom and upstanding marginal walls, certain of said walls having water circulating openings, means carried by said receiver whereby it may be supported from an interior part of the tank and immersed in the water in the tank with the top facing upwardly, a receptacle for the worms, said receptacle being seated removably in the receiver and having an upstanding handle, the openings in said receiver being elongated slots located just above the level of the bottom of the receiver, said receptacle comprising a relatively shallow imperforate pan, the top edges of the walls thereof being in a plane above the slots but below said top edges, a portion of said handle extending well above the open top of the receiver, a drip tray removably mounted atop said handle, said drip tray having means whereby it may be detachably mounted on and beneath the pan whenever necessary or desired, said means comprising a stud on the bottom of the tray which is adapted to fit telescopically and removably into a socket provided therefor on the bottom of said pan.

6. For utilization in a toilet flush tank; means for storing and preserving live worms comprising an open top box-like receiver having a bottom and upstanding marginal walls, certain of said walls having water circulating openings, means carried by said receiver whereby it may be removably supported from an interior part of the tank and immersed in the water in the tank with the top facing upwardly and a keeper having a receptacle for the worms, said receptacle comprising a relatively shallow pan, the latter being seated removably in the receiver and having an upstanding handle, the depth of said receiver being greater than the depth of said receptacle, said handle extending well above the level of the open top of said receiver so that it may be grasped by hand to lift the pan from its normal worm storing position in the receiver and so that the pan may be otherwise conveniently carried and handled.

References Cited in the file of this patent

UNITED STATES PATENTS

| | | |
|---|---|---|
| 2,701,548 | Wolfe | Feb. 8, 1955 |
| 2,718,211 | Pettas | Sept. 20, 1955 |
| 2,754,800 | Gare | July 17, 1956 |
| 2,761,422 | Martin | Sept. 4, 1956 |